Sept. 9, 1958  J. R. TAVIS ET AL  2,851,664

GALVANOMETER STRUCTURE

Filed June 1, 1954

INVENTORS.
JOHN R. TAVIS
CECIL C. TAYLOR
BY
James B. Christie
ATTORNEY

United States Patent Office 2,851,664
Patented Sept. 9, 1958

2,851,664
GALVANOMETER STRUCTURE

John R. Tavis and Cecil C. Taylor, Los Angeles, Calif., assignors, by mesne assignments, to Consolidated Electrodynamics Corporation, Pasadena, Calif., a corporation of California Application June 1, 1954, Serial No. 433,697

8 Claims. (Cl. 324—154)

This invention relates to improvements in means for supporting the suspension system of a galvanometer.

A typical galvanometer comprises a lightweight fine wire coil held in suspension between a pair of stretched wires or ribbons respectively anchored at opposite ends to an enclosing galvanometer case. The suspension means defines the axis of rotary motion for the coil and supports a small mirror which is generally symmetrically arranged about this axis for deflection responsive to rotation of the coil. A window in the galvanometer case aligned with the mirror enables incidence and reflection of a light beam at the mirror for sensing displacement of the coil. A pair of magnetizable pole pieces may be mounted through opposite walls of the case to define a narrow gap in the interior of the case in which the galvanometer coil is located. The pole pieces extend outwardly of the case and they are employed to engage slots in a magnet mounting block.

The coil suspension means in the form of conductive wire or ribbon provide electrical leads to the coil. The upper suspension means usually carries the mirror and is ordinarily anchored to a top terminal post sealed through the top end of the galvanometer case and serving as one external contact. The lower suspension is generally resiliently anchored, as by a captive spring, the tension of which may be varied by a screw adjustment to which one end of the spring is anchored. A fine wire lead is affixed to the spring anchoring means and is carried upwardly in the casing and through a side wall thereof into a terminal housing wherein it is mechanically held in contact with a second terminal post. A galvanometer of this character is described in co-pending United States application, Serial No. 326,899, filed in the name of John R. Tavis on December 19, 1952, entitled, "Galvanometer."

Usually the top terminal post is rotated to position the mirror carried by the upper suspension means so as to adjust the direction along which the light beam may be directed. Inasmuch as the top terminal post generally is mounted on an insulation sleeve, usually made of plastic, it is difficult to rotate the terminal post because of a great variation in torque due to the friction generated. The possibility of small longitudinal displacements of the terminal post is present, and such displacements vary the tension of the suspension system. Also, when the top terminal post is rotated to position the mirror, the suspension assembly may be damaged by twisting it too far.

It is difficult to adjust the tension on the suspension assembly because ordinarily the galvanometer must be removed from the magnet mounting block in order to gain access to the adjustment screw. It is usually desirable to locate the screw for adjusting the tension on the suspension assembly at the end of the galvanometer in which the spring is located so that the suspension system will not be displaced when the tension is adjusted. In conventional galvanometers the spring for the suspension assembly is located at the bottom of the galvanometer case, and hence the arrangement for adjusting the tension is usually inaccessible unless the galvanometer is removed from the magnet mounting block.

These difficulties are overcome in the present invention by providing a supporting sleeve having resilient fingers located between the insulation sleeve and the terminal post so that a uniform torque is obtained when the terminal post is rotated to adjust the mirror, a spring washer arrangement located between the bottom of the supporting sleeve and a snap ring affixed on the lower portion of the terminal post so that longitudinal movement of the terminal post is prevented, and a collar mounted on the terminal post having a stop pin located inside a recessed or cut-out portion of the supporting sleeve so that the engagement of the pin with either side of the cut-out prevents further rotation of the terminal post in that direction. With such a supporting arrangement, the spring for maintaining tension on the suspension assembly and the screw for adjusting the tension may be located at the top of the galvanometer case inside the upper terminal post, so that the tension of the suspension assembly may be adjusted without requiring that the galvanometer be removed from its magnet mounting block.

In a preferred embodiment of the invention, we provide a terminal post having a concentric threaded bore or hole extending longitudinally through the post. The ribbon of the upper suspension means extends through the lower portion of the hole in the terminal post and it is connected to a mounting screw located in the hole by a tension spring. A supporting sleeve having resilient fingers supports the terminal post in an insulated sleeve which is affixed to the top of the galvanometer case. A snap ring is provided at the lower portion of the terminal post on which a spring washer is mounted which engages the resilient fingers to resist longitudinal displacement of the terminal post. A stop collar is provided adjacent the top of the supporting sleeve which has a stop pin inserted into a cut-out portion in the supporting sleeve so that rotary movement of the suspension means enclosed in the terminal post is limited.

These and other features will become apparent upon a reading of the specification in connection with the drawings, in which.

Figure 1:
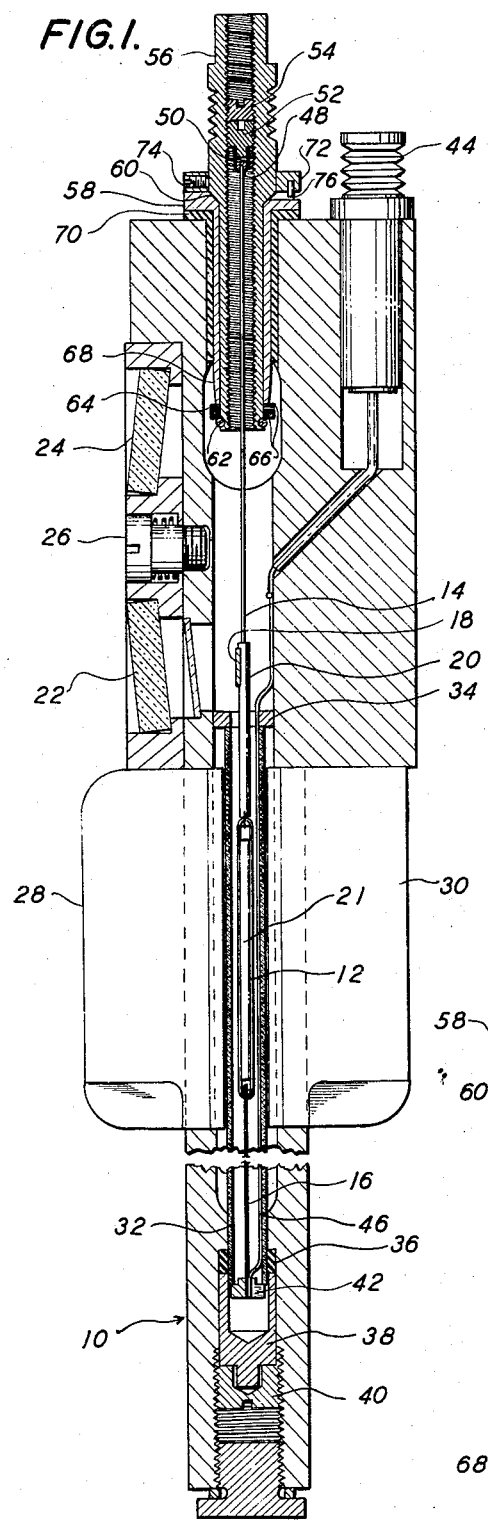
Fig. 1 is a sectional elevation view of a galvanometer illustrating the suspension assembly support of the invention.
Figure 2:
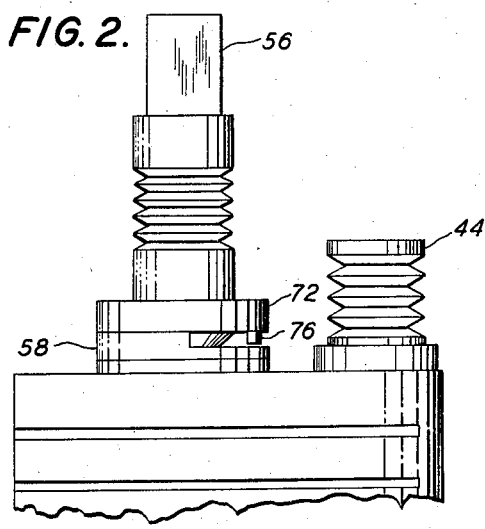
Fig. 2 is a fragmentary front view showing the terminal post arrangement at the top of the galvanometer.
Figure 3:
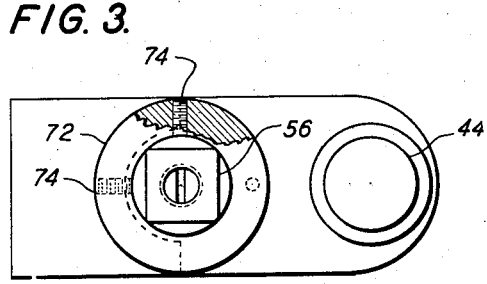
Fig. 3 is a plan view of the terminal post at the top of the galvanometer.

The drawings show how the suspension system support of the present invention may be employed in one type of galvanometer. It will be apparent that the suspension system support may be employed in various types of galvanometers and that it is not limited to the specific type of galvanometer illustrated.

The galvanometer comprises an elongated case 10 which encloses a suspension system. The suspension system comprises an elongated coil 12 which is supported by an upper suspension wire 14 and a lower suspension wire 16. A small mirror 18 is affixed to a stiffening tube 20 which in turn is affixed to the upper suspension wire, so that the mirror is moved in accordance with the deflection of the coil. Preferably, the center portion of the coil 12 is reinforced by a stiffening element 21 which extends longitudinally inside the coil, and which is bonded to the coil with cement.

A lens 22 is supported in the galvanometer case adjacent the mirror, so that light may be directed to the mirror from a source outside the case, and so that the light which is reflected by the mirror through the lens 22 may be employed to ascertain the deflection of the mirror. Thus, the light reflected by the mirror serves as a measure of the rotation of the coil 12, which in turn is dependent upon the current which flows through the coil.

In the galvanometer illustrated, an auxiliary lens 24 is provided. The location of the lenses 22 and 24 may be interchanged by removing a mounting screw 26 and reversing the locations of the two lenses.

If desired, a pair of magnetizable pole pieces 28 and 30 may be mounted through opposite walls of the galvanometer case to define a narrow gap in which the galvanometer coil is located. This serves to increase the intensity of the magnetic flux which acts upon the coil. The pole pieces extend outside the case and they are inserted into slots in a magnet mounting block.

In the galvanometer illustrated, a damping tube 32 is provided for damping the rotary movement of the suspension system. Fluid within the damping tube exerts a damping force upon the rotary movement of the coil and its associated stiffner, so as to provide viscous dampening.

Preferably, the damping tube is composed of an insulating material, such as glass, and it is supported between an annular support 34 at the upper portion of the suspension system, and by a gasket 36 at the lower end of the suspension system. The gasket is secured by a cup 38 which in turn is positioned by a screw 40.

The lower suspension wire is soldered to a conductive cup 42 which rides on the lower end of the damping tube. The damping tube arrangement shown in Fig. 1 is more fully discussed in co-pending application Serial No. 386,873 which was filed on October 19, 1953, entitled, "Suspension Galvanometer."

The lower suspension wire 16 is electrically connected to a terminal 44 at the top of the galvanometer by a wire 46.

The upper suspension wire 14 of the suspension system is attached to the suspension assembly support of the present invention. The upper suspension wire 14 is soldered to a conductive terminal piece 48 which is connected to a helical spring 50. The spring is connected to a conductive mounting screw 52. A retaining screw 54 is provided for locking the mounting screw in a desired location.

The screws 52 and 54 are located in a threaded hole which extends longitudinally through a terminal post 56. The location of the screws 52 and 54 may be adjusted by causing them to move upwardly or downwardly within the terminal post. The terminal post 56 provides the other external electrical contact for the coil of the galvanometer.

The terminal post 56 is rotatably mounted in a supporting sleeve 58. The supporting sleeve is provided with a counter-sunk recess 60 defining a first frusto-conical surface which engages a mating beveled surface defining a second frusto-conical surface on the terminal post, so as to prevent downward movement of the terminal post.

Upward movement of the terminal post is restrained by a snap ring 62 which is affixed to the lower portion of the terminal post, and a spring washer arrangement located between the snap ring and the lower end of the supporting sleeve. The spring washer arrangement comprises a spring washer 64 located between a pair of flat washers 66.

Figure 4:
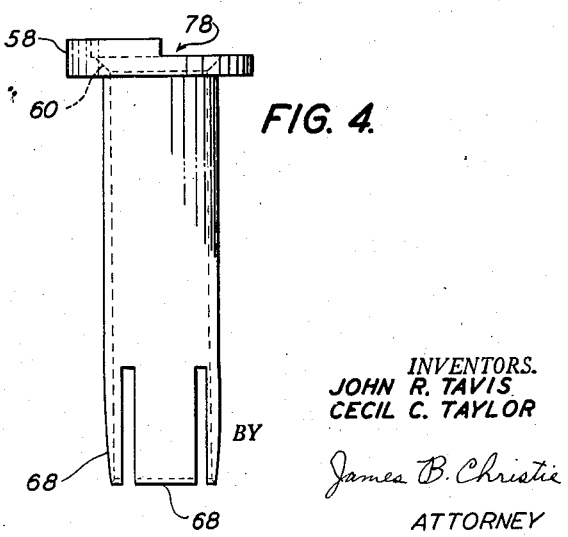
Fig. 4 is an elevational view of a supporting sleeve which is employed in the terminal post assembly.

As more clearly shown in Fig. 4, the supporting sleeve is provided with a plurality of resilient fingers 68 which are arranged to provide a spring grip on the outer surface of the terminal post. These resilient fingers serve to provide substantially constant frictional contact with the terminal post, so that the terminal post may be rotated with a smooth action when adjustment of the suspension system is required.

The supporting sleeve 58 is cemented to an insulation sleeve 70 which in turn is cemented to the upper portion of the galvanometer case.

Since the supporting sleeve 58 and the insulation sleeve 70 are fixed to the galvanometer case, and since longitudinal movement of the terminal post 58 is restrained by the beveled edge 60 and the washer assembly 64, 66, there can be no longitudinal movement in the support for the upper suspension wire when the upper suspension support is adjusted.

A collar 72 is secured to the terminal post above the supporting sleeve by a plurality of set screws 74. Stop pin 76 is affixed to the collar and it extends into a cut-out portion 78 in a flange at the upper end of the supporting sleeve 58. The cut-out portion 78 is arranged to permit approximately 180° movement of the terminal post 56 before the stop pin 76 engages the shoulders on the supporting sleeve 58 at the extremities of the cut-out portion. Thus, the stop pin arrangement prevents the terminal post 56 from being rotated far enough to damage the suspension system which is carried by it.

The tension on the suspension system is adjusted by moving the mounting screw 52 upwardly or downwardly in the terminal post. This must be done without twisting the suspension system. In order to do this, the locking screw 54 is removed, and the set screws 74 are loosened so as to permit the terminal post 56 to rotate inside the collar 72. Then a screw-driver is inserted into the slot in the mounting screw 52 so as to prevent rotation of this screw. The terminal post 56 is then rotated in the desired direction, so as to cause the screw 52 to move upwardly or downwardly within the terminal post. When the desired tension is obtained on the suspension system, the locking screw 54 and the collar 72 are again positioned as shown in the drawings. The stop pin 76 in the collar 72 permits approximately 180° rotation of the terminal post so that the mirror may be positioned to receive light from and reflect light through the lens 22.

This support for the suspension assembly permits all of the adjustments which must be made upon the suspension system to be made at the top of the galvanometer, so that these adjustments may be effected while the galvanometer is located in its magnet mounting block, rather than requiring the removal of the galvanometer.

The resilient fingers on the supporting sleeve for the upper terminal post provide a substantially constant spring grip on the terminal post, so that a substantially constant torque is required to rotate the post in order to adjust the position of the mirror. The spring washer arrangement which is located between the supporting sleeve and the terminal post prevents longitudinal movement of the terminal post, and the stop pin and collar arrangement which is carried by the terminal post prevents the suspension system from being twisted too far during adjustment of the mirror.

We claim:

1. In a galvanometer having a suspension system which is enclosed by a case, a support for one end of the suspension system comprising a terminal post member extending into the galvanometer case for providing electrical connection with one end of the suspension system, a sleeve extending into the galvanometer case and disposed around a portion of the terminal post member for rotatably supporting it, the sleeve having a plurality of flexible fingers for providing a spring grip on a portion of the terminal post inside the case, the sleeve also having a cut-out portion in its upper end for receiving a stop pin, a removable flange secured to the terminal post adjacent the cut-out portion of the sleeve, a pin affixed to the removable flange and extending into said cut-out portion for limiting rotary movement of the terminal post, and an insulating sleeve located between the supporting sleeve and the end of the galvanometer case.

2. In a galvanometer having a case which encloses a suspension system including a coil and a mirror located above the coil, a support for the upper end of the suspension system comprising a terminal post extending into the galvanometer case and having an internal thread extending longitudinally through it, a screw located inside the terminal post with its threads engaging those of the terminal post, a spring connected between the screw and the upper end of the suspension system of the galvanometer, a supporting sleeve disposed around the portion of the terminal post which extends into the galvanometer case for rotatably supporting it, the supporting sleeve having a plurality of flexible fingers for providing a spring grip on the terminal post, the supporting sleeve also having a cut-out portion in its upper end for receiving a stop pin, a removable flange secured to the terminal post adjacent the cut-out portion of the supporting sleeve, a pin affixed to the removable flange and extending into said cut-out portion for limiting rotary movement of the terminal post, the supporting sleeve and the terminal post having mating surfaces at the outer end of the supporting sleeve for preventing longitudinal movement of the terminal post in one direction, a snap ring affixed to and located adjacent the end of the terminal post which extends inside the case, spring washer means located between the snap ring and the adjacent end of the supporting sleeve for preventing longitudinal movement of the terminal post in the other direction, and an insulating sleeve located between the supporting sleeve and the upper end of the glavanometer case, with the insulating sleeve being affixed to the galvanometer case and the supporting sleeve being affixed to the insulating sleeve to provide a fixed support for the rotatable terminal post.

3. In a suspension galvanometer having a coil suspension system, a case for housing the coil suspension system having an opening thereinto at its top, an insulator sleeve positioned in said opening and defining an electrically insulated passageway from the outside to the inside of said case, means rigidly securing said insulator sleeve to said case, a supporting sleeve having a hole therethrough positioned in said insulator sleeve and extending inwardly beyond said insulator sleeve, means rigidly securing said supporting sleeve to said insulator sleeve such that the longitudinal axis of its hole conforms precisely with a predetermined axis of rotary motion for the coil, said supporting sleeve having a peripheral countersunk portion at its upper end defining a first frusto-conical surface, a terminal post rotatably mounted in said supporting sleeve and protruding beyond both ends of said supporting sleeve, said terminal post having a peripheral beveled portion defining a second frusto-conical surface which mates with said first frusto-conical surface to maintain alignment of said post with the axis for rotary motion for the coil and to restrict movement of said post into the case, means coupled to the protruding lower end of the terminal post and in engagement with the lower end of the supporting sleeve for restricting upward movement of the terminal post, said terminal post having a longitudinally extending bore extending entirely therethrough, said bore being threaded and of a size to house without contact the upper end of the coil suspension system, and means adjustably connecting the upper end of the coil suspension system to the terminal post including a screw threaded into the threaded bore enabling variation of the effective length of the suspension system.

4. Apparatus of claim 3 further comprising means including a collar rotatably mounted on the upper protruding portion of the terminal post and engageable with portions of the upper end of the supporting sleeve for limiting the angular distance through which the terminal post rotates inside the supporting sleeve to less than a complete revolution, and means for releasably fixing the collar with respect to the terminal post.

5. Apparatus of claim 4 wherein the supporting sleeve has a recess in its upper end, and wherein the collar has a depending portion which extends into the recess in the upper end of the supporting sleeve.

6. In a galvanometer having a case which encloses a suspension system, a support for the upper end of the suspension system comprising a sleeve member extending through the upper end of the case, means coupling the sleeve member to the case, an elongated terminal post member extending coaxially through the sleeve member and protruding from both ends of the sleeve member, the terminal post member being rotatable with respect to the sleeve member, the portion of the terminal post which extends through the sleeve member having a substantially cylindrical outer surface, the sleeve member having a plurality of flexible fingers formed integrally at its lower end and exerting a spring grip on said cylindrical surface of the terminal post member, the sleeve member and the terminal post member having mating surfaces adjacent the upper end of the sleeve member for preventing downward movement of the terminal post member through the sleeve member, means coupled to the protruding lower end of the terminal post member and in engagement with the lower end of the sleeve member for restricting upward movement of the terminal post through the sleeve member, and means coupling the terminal post to the upper end of the suspension system.

7. In a galvanometer having a case with an opening at its upper end, the combination which comprises a supporting sleeve extending completely through and past said opening, the supporting sleeve having a plurality of flexible fingers formed integrally at its lower end, means including an insulator rigidly securing the supporting sleeve to the case, an elongated terminal post rotatably mounted in said supporting sleeve and protruding from both ends thereof with the flexible fingers of the supporting sleeve exerting a spring grip on the terminal post, the terminal post and the supporting sleeve having mating surfaces at the upper end of the sleeve for restricting downward movement of the terminal post through the sleeve, means coupled to the protruding lower end of the terminal post and in engagement with the lower end of the sleeve for restricting upward movement of the terminal post through the sleeve, and means connecting the terminal post to the upper end of the suspension system.

8. Apparatus of claim 7 wherein the mating surface of said sleeve is a countersunk portion defining a first frusto-conical surface and the mating surface of said terminal post is a peripheral beveled portion defining a second frusto-conical surface.

References Cited in the file of this patent

UNITED STATES PATENTS

| | | |
|---|---|---|
| 1,397,441 | Miller | Nov. 15, 1921 |
| 2,149,442 | Kannenstine | Mar. 7, 1939 |
| 2,234,430 | Ellis | Mar. 11, 1941 |
| 2,535,065 | Heiland | Dec. 26, 1950 |
| 2,599,661 | Richardson | June 10, 1952 |
| 2,646,546 | Morrow | July 21, 1953 |
| 2,762,989 | Johnson | Sept. 11, 1956 |